Figure 1:
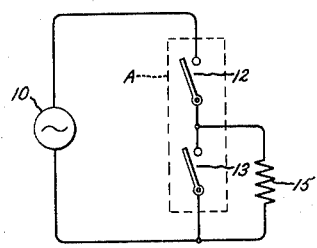

Inventor:
Arthur E. Were,
by J. Wesley Vanbuer
His Attorney.

United States Patent Office 2,819,445
Patented Jan. 7, 1958

2,819,445

METHOD AND APPARATUS FOR TESTING CIRCUIT BREAKERS

Arthur E. Were, Springfield, Pa., assignor to General Electric Company, a corporation of New York Application November 17, 1954, Serial No. 469,348

15 Claims. (Cl. 324—28)

This invention relates to methods and apparatus for testing high-capacity power circuit breakers and, more particularly, high-capacity breakers of the multi-break type.

Many large circuit breakers are required, under actual field conditions, to interrupt power which exceeds that which is available for testing the breaker. To enable such breakers to be tested, it is necessary that a source of relatively low power be utilized to simulate the high power interrupting conditions which will be actually encountered in the field. To this end, a number of testing schemes have been devised, but, to my knowledge, these have either required complex testing apparatus or have been incapable of fully utilizing the power which is actually available at the test station.

Accordingly, it is an object of my invention to provide an improved circuit breaker testing scheme which is capable of efficiently utilizing a source of relatively low power to simulate high power interrupting conditions.

As disclosed hereinafter, this source of relatively low power is capable of supplying a testing current equal to the full current which the breaker, in the field, will be required to interrupt but a testing voltage considerably less than the rated voltage of the breaker, or interrupter. If a multi-break interrupter is directly tested from such a source of reduced voltage, this reduced voltage would distribute itself across the individual breaks in the same general manner as in the field, and, as a result, these individual breaks would be subjected to voltages less than the actual field voltages. To simulate more closely actual field conditions, it would be necessary to apply a major portion and, in many cases, the entire testing voltage to each individual break.

Accordingly, another object of my invention is to provide a testing arrangement which is capable of applying substantially the entire testing voltage to each of the individual breaks of the multi-break interrupter being tested.

My invention is particularly suited for the type of test in which it is desired to evaluate (1) the ability of the multi-break interrupter to withstand the mechanical stresses imposed by arcs occurring substantially simultaneously at all of the breaks, and (2) the interrupting ability of a particular individual break of the interrupter. To enable an accurate evaluation of both of these capabilities and especially the second, it is important that the particular break which is being tested is subjected to current for a duration of time representative of actual field conditions. To this end, it is important that a break other than the one being tested does not prematurely effect circuit interruption.

Accordingly, another object of my invention is to provide a testing arrangement which minimizes the likelihood that one of the breaks other than the one being tested will effect premature circuit interruption.

In accordance with one form of my invention, the multi-break circuit interrupter which is to be tested has all of its breaks except the one being tested shunted by impedance means. The break being tested is left unshunted. The interrupter is connected across a source of power which is capable of delivering the full current which is to be encountered in the field but only a portion of the field voltage. When the first current zero occurs after the breaks of the interrupter are simultaneously opened, a voltage, commonly known as the recovery voltage, rapidly builds up across the unshunted break. If, in the meantime, the dielectric strength of the unshunted break had built up sufficiently rapidly and to a sufficiently high value, this recovery voltage would rise to its peak value without reigniting the break. The testing arrangement of my invention permits this peak value to be as high as the full recovery voltage which is available from the source of test power. Should the unshunted break fail to withstand this voltage, which is the usual case at the first current zero, the break would reignite, in response to which, the voltage across the shunted break or breaks would begin to rapidly rise. Since substantially the full recovery voltage is available across these latter breaks, these, too, usually break down, thereby permitting current to continue so that the first break is given another opportunity at the next current zero to effect successful interruption.

One particular form of my invention is especially applicable to testing multi-break interrupters having three breaks. In this particular form, the impedence means which shunts the two breaks that are not being tested comprises a first impedance connected in parallel with the series combination of two of the breaks and a second impedance conected in parallel with one of these breaks but in series with the other. This arrangement permits the entire testing voltage to be applied to each of these two breaks, thereby providing highly favorable conditions for reigniting these latter two breaks, so that the first, or tested, break will be given another opportunity to clear at the next current zero.

Another form of my invention which is especially applicable to three-break interrupters comprises a first impedance means connected in parallel with the series combination of a first and second one of the breaks and in series with the third break, and second impedance means connected in series with the first break and in parallel with the series combination of the second and third breaks. This arrangement permits the entire test station voltage to be simultaneously applied to each of the three breaks, and, for this reason, it is especially useful for quickly locating and testing the weakest of the three breaks.

Figure 2:
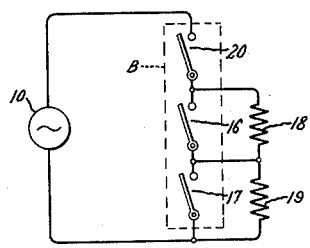
Figure 2A:
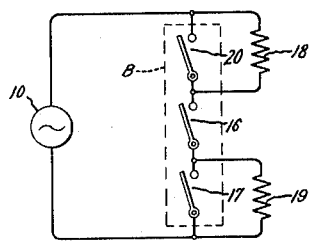
Figure 3:
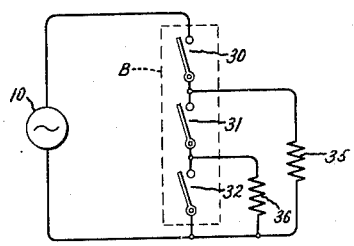
Figure 4:
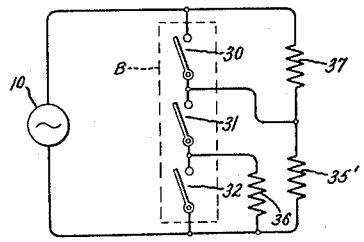
Figure 5:
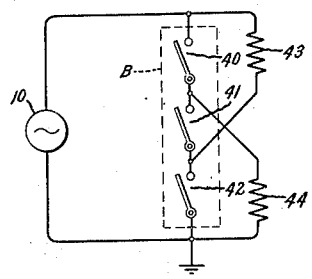
Figure 5A:
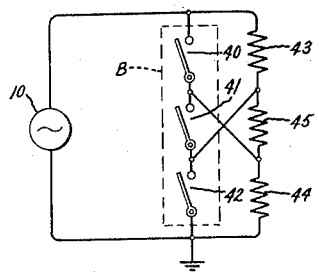

The invention will be more readily understood from the following detailed description when considered in connection with the accompanying drawing. Those features of the invention which are believed to be novel and patentable will be pointed out in the claims appended hereto. In the drawing, Fig. 1 is a schematic showing of one form of my invention as applied to a multi-break circuit interrupter having two breaks. Fig. 2 is a schematic showing of one form of my invention as applied to a circuit interrupter having three breaks. Fig. 2a is a schematic showing similar to Fig. 2 but illustrating an arrangement for testing the center break of the interrupter rather than the upper break as is shown in Fig. 2. Figs. 3 and 4 are schematic showings of other embodiments of my invention which are especially applicable to the testing of three break circuit interrupters. Figs. 5 and 5a are schematic showings of still other testing arrangements embodying my invention.

Referring now to Fig. 1, I have shown a circuit interrupter A which is to be tested from a source of alternating power, such as a generator 10. The interrupter A, which I have shown schematically, is of a conventional multi-break type comprising two series-connected breaks 12 and 13 which are arranged to be opened simultaneously. An example of this type of interrupter is shown in U. S. Patent No. 2,164,175 issued to E. J. Frank and assigned to the assignee of this invention. For the purposes of this explanation, it will be assumed that the interrupter A, under actual field conditions, will be required to interrupt power which exceeds that which the generator 10 is capable of providing. More specifically, it will be assumed that the generator is capable of delivering a testing current equal to the maximum current which the interrupter, in the field, will be required to interrupt but a testing voltage which is considerably less than the rated voltage of the interrupter.

If the test is one in which it is desired to evaluate the interrupting ability of break 12, then, in accordance with one form of my invention, this break 12 is left unshunted, and an impedance is connected in shunt relationship with the other break 13. Although this impedance may be either a capacitor or a resistor, preferably it is a high ohmic resistor, such as shown schematically at 15.

When the contacts forming the breaks 12 and 13 are initially separated, a pair of simultaneously-occurring, series related arcs will be immediately established thereat. Current will continue to flow through these arcs until a first current zero occurs. At this instant, the arc vanishes and a voltage, commonly known as the recovery voltage, rapidly builds up across the open break 12. If, in the meantime, the dielectric strength of the break 12 had built up sufficiently rapidly and to a sufficiently high value, this recovery voltage would rise to the full recovery voltage available from the source 10. This is the case because at current zero no current flows through the impedance 15 and therefore both sides of the break 13 are at the same voltage. Thus, with zero voltage present across the break 13, the entire recovery voltage is available across break 12. Should break 12 fail to withstand this voltage, it would immediately break down and cause substantially the entire voltage to be applied to break 13. In most cases this break 13 would then immediately break down. As a result, current would continue at least until the next current zero occurred, at which time this sequential breakdown process would again be initiated. If the breaks then failed to withstand the recovery voltage, the process would be repeated at successive current zeros until the arc was finally extinguished.

Thus, it may be seen that this arrangement of Fig. 1 permits substantially the full testing voltage to be applied to each of the breaks 12 and 13. This is the equivalent of a direct test of the interrupter at a much higher voltage than that available from the generator 10. For example, should the resistor 15 be omitted, as would be the case in a direct test, the recovery voltage would be distributed between each of the breaks, as a result of which each of the breaks would be subjected to only a fraction of full recovery voltage. Assuming that the self-capacitances of the breaks are equal, only half of the recovery voltage would be applied to each break. Under such direct testing conditions, twice the voltage available from the generator 10 would be required to duplicate the effective recovery voltages provided by my indirect testing arrangement. Stated otherwise, the testing arrangement of Fig. 1 enables me to simulate a direct test at twice the recovery voltage available from the generator 10.

Break 13 can be tested in the same manner as described above for break 12 simply by connecting resistor 15 in shunt across break 12 instead of across break 13.

The invention of Fig. 1 is also applicable to a circuit interrupter having more than two breaks. For example, in Fig. 2, I have shown a three break circuit interrupter B which is to be tested in accordance with the invention. Two of the breaks 16 and 17 are respectively shunted by resistors 18 and 19, whereas the remaining break 20, which is the one to be tested, is unshunted. The resistor 18 has an impedance which is substantially larger than the impedance of resistor 19. Preferably, the ratio between these impedances should be on the order of 10 to 1. At the first current zero which occurs after the breaks 16, 17, and 20 are simultaneously opened, full recovery voltage becomes available across the break 20. Should this break 20 fail to withstand this recovery voltage, it breaks down and causes substantially the entire recovery voltage to become available across the series combination of breaks 16 and 17. This voltage will be divided in accordance with the impedance ratio between resistors 18 and 19. If resistor 18 has an impedance ten times that of resistor 19, $10/11$ of the recovery voltage will be available across the break 16. Should this break reignite, then substantially the full recovery voltage would then be available across the third break 17. In most cases, this break 17 would reignite, and, as a result, the entire sequential breakdown process would be initiated at successive current zeros until the contacts forming the breaks had been sufficiently separated to effect successful circuit interruption. A suitable back-up breaker (not shown) may be provided to interrupt the circuit in the event that the tested interrupter fails to perform in the desired manner.

As shown in Fig. 2a, the center break 16 can be tested in the same manner as described above for break 20 simply by connecting the resistor 18 across the break 20 instead of across break 16. Full recovery voltage is available first across break 16, and should this break fail to withstand this voltage, it breaks down and causes the recovery voltage to be divided between breaks 20 and 17 in accordance with impedance ratio of resistors 18 and 19 respectively. The breakdown process then continues in a manner corresponding to that described for the arrangement of Fig. 2.

The fact that the resistors 18 and 19 of Fig. 2 must have a predetermined impedance ratio frequently can be a significant disadvantage. For example, let it first be assumed that the impedance of resistor 18 conforms to the minimum value which will provide the desired rate of rise of the recovery voltage across break 16. If the resistor 19 has an impedance equal to only $1/10$ of this value, it is likely that the rate of rise of the recovery voltage across break 17 will be so low that break 17 will effect interruption of the circuit at too early a current zero. If the circuit is thus prematurely interrupted at break 17, then it is impossible to accurately evaluate the performance of break 20 because break 20 will not be subjected to voltage and current for a duration as great as would be encountered under actual field conditions.

Conversely, let it be assumed that resistor 19 has a sufficiently high impedance so as to provide the desired rate of rise of the recovery voltage across break 17. If resistor 18 is given an impedance ten times that of such a resistor 19, then there is a danger that the self-capacitance of the break 16 will produce a different voltage division from that desired. This may be explained by the fact that the higher is the impedance of resistor 18, the higher is the rate of rise of the recovery voltage across break 16, and the lower is the capacitive reactance of break 16. If the capacitive reactance of break 16 is low, the resistor 18 will have little control over the voltage distribution between breaks 16 and 17. If the voltage division deviates from that desired, there is once again the possibility of premature circuit interruption by one of the breaks other than the one being tested.

To overcome the above difficulties and to enable the designer to select shunting elements without regard for their impedance ratio, I have provided a testing arrangement such as shown in Fig. 3. The circuit interrupter B of Fig. 3 is identical to the interrupter of Fig. 2 and comprises three series-connected, simultaneously-operable breaks which I have designated 30, 31, and 32, the break 30 being the one which it is desired to test. Connected in series with the break 30 and in parallel with the series combination of brakes 31 and 32, I provide a first impedance 35. Connected in series with the break 31 and in parallel with break 32, I provide a second impedance 36.

When the breaks 30, 31, and 32 are simultaneously opened and the first current zero occurs, full recovery voltage will be available across the break 30. Should this break fail to withstand this recovery voltage, it would reignite and cause substantially the full recovery voltage to become available across the center break 31. This is the case because, at this instant, i. e., at current zero, no current is flowing through resistor 36, and hence, both sides of final break 32 are at the same voltage. With zero voltage across break 32, the full recovery voltage is avaiłaable across break 31. Should this break 31 fail to withstand this recovery voltage, it will reignite and cause substantially the full recovery voltage to become available across the final break 32. In most cases, this final break will then reignite and, as a result, current will continue flowing until another current zero occurs. The same sequential breakdown process will then be initiated and unless successful circuit interruption occurs, will be repeated at successive current zeros until interruption finally does take place.

It should be apparent from this operational description that no particular ratio of the values of impedances 35 and 36 is required. The value of the impedance 35 may be selected to provide the desired rate of rise of recovery voltage across break 31 and the value of impedance 36 may be independently selected to provide the desired recovery rate across break 32. In contrast to the arrangement of Fig. 2, the voltage distribution between the last two breaks is essentially independent of the impedance ratio of the shunting elements. Another advantage which the arrangement of Fig. 3 has over that of Fig. 2 is that full recovery voltage is available across the center break. As a result, there is less chance that the circuit will be prematurely interrupted at this center break. This increases the likelihood that current will flow for at least the same duration as would occur under actual field conditions, thus, enabling the performance of tested break 30 to be more accurately evaluated.

It will be readily apparent that the break 32 of Fig. 3 may be tested in a manner corresponding to that described above for break 30 simply by leaving the break 32 unshunted and connecting the impedances 35 and 36 across the breaks 30 and 31, i. e., with impedance 35 shunting breaks 30 and 31 and impedance 36 shunting break 30.

In Fig. 4 I have shown still another embodiment of my invention which is similar to Fig. 3 but differs therefrom in that the first, or tested, break 30 is shunted as by an impedance 37. This testing arrangement is especially useful in those circuit breakers where it is desired to examine a break which it is known will be subjected to recovery voltages in the field which are less than those available from the source of test power. The test voltage applied to the break 30 will be determined by the ratio of impedance 37 to impedance 35'.

This arrangement of Fig. 4 is especially advantageous in that full recovery voltage will be available across each of the breaks 31 and 32 in response to breakdown of the tested break 30. Because the recovery voltage is capable of rising to this high value, in comparison to the voltage available across the tested break 30 the likelihood that either of these breaks (31 or 32) will prematurely interrupt the circuit is slight. As a result, the tested break 30 will be subjected to current for at least the same duration as would be expected in the field.

In Fig. 5 I have disclosed still another arrangement for testing a multi-break circuit interrupter. The interrupter is again designated B and has three series-connected, simultaneously-operable breaks 40, 41, and 42 which correspond to similar breaks in Fig. 3. The breaks 40 and 42 may be thought of as being outer breaks and the break 41 as a center break with the outer breaks 40 and 42 being electrically connected to the center break 41 at opposite electrical sides thereof. In accordance with this form of my invention, a first impedance 43 is connected in series with break 42 and in parallel with the series combination of breaks 40 and 41. A second impedance 44 is connected in series with the break 40 and in parallel with the series combination of breaks 41 and 42.

This testing arrangement of Fig. 5 is especially useful where it is desired to quickly locate the weakest of the three breaks and to evaluate its interrupting ability. For example, when the first current zero occurs after the breaks 40, 41 and 42 are simultaneously opened, full recovery voltage becomes simultaneously available across each one of the three breaks. Assuming that the breaks are incapable of withstanding this voltage, the weakest of the three breaks will first reignite, after which the other two breaks will sequentially reignite and cause current to flow for at least another half cycle.

The reason that full recovery voltage is available across each one of the breaks will be apparent when it is considered that, at current zero, no current is flowing in either resistor 43 or 44. As a result, the junction between breaks 40 and 41 is at ground potential (assuming that the lower terminal of the generator 10 is grounded as shown), and the junction between breaks 41 and 42 is at line potential. Thus, opposite terminals of each of the breaks 40, 41, and 42 are respectively at line and ground potential and, accordingly, full voltage is available across each of the three breaks. It will be observed that this is made possible by the fact that the voltage applied across the center break is opposite in polarity to the voltage applied across the outer breaks.

If it is assumed that break 40 is the weakest of the breaks and, accordingly, is the first to break down, the voltage across the center break 41 will be rapidly reduced, but the entire instantaneous recovery voltage continues to be impressed across the lower break 42. As a result, this break 42 quickly follows break 40, after which full voltage becomes available across the remaining break 41. This break 41 reignites and causes current to flow for successive half cycles until the circuit is finally interrupted.

Preferably, one of the resistors 43 or 44 has an impedance on the order of 10 times as large as the impedance of the other resistor. This insures that if the center break is the weakest and, hence, breaks down first, the recovery voltage appearing across the remaining two breaks will be highly unbalanced. This, of course, favors reignition of the more highly stressed break and minimizes the likelihood that such break will effect premature circuit interruption. In response to breakdown of this more highly stressed break, full voltage becomes available across the remaining break, thereby favoring its reignition, thus giving the first break another opportunity to clear at the next current zero.

A distinct advantage of the arrangement shown in Fig. 5 is that there is little chance that the break which is second in order of ignition will cause premature circuit interruption. As explained previously, such premature interruption is undesirable since it prevents the tested break from being subjected to current for a representative duration of time. The reason for this characteristic of the second break is that recovery voltage builds up thereacross simultaneously with its build up across the first break. As a result, this second break is not permitted, during this interval, to establish its dielectric strength free from the stresses imposed by the rising recovery voltage. This renders the second break particularly vulnerable to reignition, as is desired in accordance with the invention. Where a sequential build up of recovery voltage across each of the breaks is permitted, as in some of the other arrangements, all of the breaks except the first one are given what, in effect, amounts to a rest period. Since, during this rest period, conditions are most favorable to the rapid growth of dielectric strength, the likelihood is greater that one of these breaks will prematurely interrupt the circuit.

When it is considered that the entire recovery voltage can be simultaneously impressed across each one of the three breaks shown in Fig. 5, it will be apparent that this arrangement is most advantageous in that it enables me to simulate a direct test at three times the voltage available from the source 10 and three times the available rate of rise of recovery voltage.

Where it is desired to vary the voltages which are available across the breaks of the interrupter shown in Fig. 5, an additional impedance can be connected across the center break and in series with the other breaks. I have shown such an arrangement in Fig. 5a, wherein an impedance 45 has been so connected across the center break. If the impedances of elements 43 and 44 are assumed to be equal and the impedance of 45 to be twice that of element 43, then at the first current zero, the voltages across breaks 40, 41, and 42, respectively, will be 75, 50, and 75 percent of the of the total test voltage. By varying the ratio of these impedances, the voltage distribution can be varied as desired. It will be noted that this arrangement, like the arrangement of Fig. 5, enables me to apply to the breaks a total voltage which exceeds the voltage across the terminals of source 10.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent is:

1. In an arrangement for testing a circuit interrupting device which has at least two series-connected simultaneously-operable breaks from a source of test voltage, the magnitude of which is less than the rated voltage of said device, impedance means connected in shunt relationship with all except one of said breaks and in series with said one break, said one break being unshunted whereby at the first current zero which occurs after said breaks are simultaneously opened substantially the entire test voltage is available across said one break.

2. In an arrangement for testing a circuit interrupting device which has a pair of opposed terminals and at least two series-connected simultaneously-operable breaks, means for applying an alternating test voltage to said terminals, impedance means connected in shunt relationship with all except one of said breaks and in series with said one break, said one break being unshunted whereby at the first current zero which occurs after said breaks are simultaneously opened substantially the entire test voltage is available across said one break.

3. In an arrangement for testing a circuit interrupting device having at least two series-connected simultaneously-operable breaks, means for delivering to the device a testing current approximating its full rated current but a testing voltage considerably less than its rated voltage, impedance means connected in parallel-circuit relationship with a first one of said breaks and in series with a second one of said breaks, said second break being unshunted, whereby at the first current zero which occurs after said breaks are simultaneously opened full testing voltage is available across said second break.

4. In an arrangement for testing a circuit interrupting device having at least three series-connected simultaneously-operable breaks, means for applying a test voltage to the device, a first impedance connected in series relationship with a first of said breaks and in shunt relationship with the series combination of the second and third of said breaks, second impedance means connected in shunt relationship with said third break and in series with said first and second breaks, whereby, upon simultaneous opening of the breaks, substantially the entire test voltage becomes available across said second break in response to reignition of said first break and substantially the entire test voltage becomes available across said third break in response to reignition of said second break.

5. In an arrangement for testing a circuit interrupting device having at least three series-connected simultaneously-operable breaks, means for applying a test voltage to the terminals of the device, first impedance means connected in series relationship with a first of said breaks and in shunt relationship with the series combination of the second and third of said breaks, second impedance means connected in shunt relationship with said third break and in series with said first and second breaks, said first break being unshunted.

6. In an arrangement for testing a circuit interrupting device having at least three series-connected simultaneously-operable breaks, means for applying a test voltage to the terminals of the device, first impedance means connected in series relationship with said first break and in shunt relationship with the series combination of the second and third of said breaks, second impedance means connected in shunt relationship with said third break and in series with said first and second breaks, third impedance means connected in series with the second and third of said breaks and in shunt with the first of said breaks, whereby only a portion of said test voltage is available across said first break but substantially the entire test voltage is available across each of said second and third breaks.

7. In an arrangement for testing a circuit interrupting device having a pair of opposed terminals and at least three series-connected simultaneously-operable breaks, means for applying a test voltage to said terminals, first impedance means connected in parallel with a first one of said breaks and in series with the second and third of said breaks, second impedance means connected in parallel with said second break and in series with the first and third of said breaks, said third break being unshunted, one of said impedance means having a substantially larger impedance than the other whereby the voltage which is applied to said first and second breaks after breakdown of said third break is unequally distributed between said first and second breaks.

8. In an arrangement for testing a circuit interrupting device having at least three series-connected simultaneously-operable breaks, means for applying a testing voltage to the terminals of the device, first impedance means connected in series relationship with the third of said breaks and in parallel circuit relationship with the series combination of the first and second of said breaks, and second impedance means connected in series relationship with the first of said breaks and in parallel with the series combination of the second and third of said breaks.

9. The arrangement of claim 8 in which a third impedance is connected in parallel with the second of said breaks and in series with said first and third breaks.

10. The testing arrangement of claim 8 in which the second of said breaks is unshunted.

11. In an arrangement for testing a circuit interrupting device which has a pair of opposite terminals and at least three series - connected simultaneously - operable breaks, means for applying a test voltage to the terminals of the device, first impedance means connected in series relationship with a third of said breaks and in parallel relationship with the series combination of a first and second of said breaks whereby at a current zero occurring after the breaks are simultaneously opened the junction between said second and third breaks is at the same potential as one of said terminals, second impedance means connected in series relationship with the first of said breaks and in parallel circuit relationship with the series combination of the second and third of said breaks whereby at said current zero the junction between said first and second of said breaks is at the same potential as the other of said terminals, thus making available substantially all of the testing voltage across each of the individual breaks during said current zero condition.

12. The arrangement of claim 11 in which one of said impedances has a substantially larger impedance than the other.

13. In an arrangement for testing a circuit interrupting device which has a pair of opposite terminals and at least three series-connected simultaneously-operable breaks, a first impedance connected between one of said terminals and the junction between the second and third of said breaks, a second impedance connected between the other of said terminals and the junction between the first and second of said breaks, and a third impedance connected between said junctions thereby shunting said second break.

14. A method of testing a circuit interrupter which has three series-connected simultaneously-operable breaks, first and second ones of said breaks being electrically connected to a third one of said breaks at opposite electrical sides of said third break, said method comprising, opening said breaks simultaneously, simultaneously applying to said first and second breaks a voltage of the same polarity and to said third break a voltage of a polarity opposite to the voltage applied to said first and second breaks, thereby simultaneously stressing each of said breaks and inviting its breakdown, and in response to breakdown of one of said breaks, sequentially igniting the remaining breaks whereby said one break is given another opportunity to interrupt the circuit.

15. A method of testing a circuit interrupting device which has three series-connected simultaneously-operable breaks, first and second ones of said breaks being electrically connected to a third one of said breaks at opposite electrical sides of said third break, said method comprising, simultaneouly opening said breaks, simultaneously applying to said first and second breaks a test voltage of one polarity and to said third break a test voltage of an opposite polarity, thereby simultaneously stressing each of the three breaks and inviting its breakdown.

References Cited in the file of this patent

FOREIGN PATENTS 983,535   France _____ Feb. 14, 1951